US011570068B1

(12) United States Patent
Trivedi et al.

(10) Patent No.: US 11,570,068 B1
(45) Date of Patent: Jan. 31, 2023

(54) USER-DEFINED NETWORK CONGESTION MONITORING SYSTEM

(71) Applicant: Rakuten Mobile, Inc., Tokyo (JP)

(72) Inventors: Vishvesh Trivedi, Tokyo (JP); Anshul Bhatt, Tokyo (JP); Dhananjay Chaubey, Tokyo (JP); Alok Singh Pawar, Madhya Pradesh (IN); Manish Patidar, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/564,046

(22) Filed: Dec. 28, 2021

(51) Int. Cl.
*H04L 43/06* (2022.01)
*H04L 43/16* (2022.01)
*H04L 43/0882* (2022.01)
*H04L 43/045* (2022.01)

(52) U.S. Cl.
CPC ............ *H04L 43/06* (2013.01); *H04L 43/045* (2013.01); *H04L 43/0882* (2013.01); *H04L 43/16* (2013.01)

(58) Field of Classification Search
CPC ... H04L 43/06; H04L 43/045; H04L 43/0882; H04L 43/16; H04L 43/062
See application file for complete search history.

(56) References Cited

U.S. PATENT DOCUMENTS

| | | | |
|---|---|---|---|
| 9,300,550 B2* | 3/2016 | Casey | H04L 67/306 |
| 9,351,193 B2* | 5/2016 | Raleigh | G06Q 40/00 |
| 10,216,621 B1* | 2/2019 | Rutten | G06F 11/3616 |
| 2014/0052847 A1* | 2/2014 | Jadallah | H04L 43/0882 |
| | | | 709/224 |
| 2018/0234307 A1* | 8/2018 | Choudhary | H04L 41/5032 |
| 2019/0102719 A1* | 4/2019 | Singh | H04L 41/5032 |
| 2019/0243749 A1* | 8/2019 | Rutten | G06F 16/217 |
| 2020/0228412 A1* | 7/2020 | Abu Asba | H04L 43/0876 |
| 2020/0236006 A1* | 7/2020 | Asba | H04L 41/22 |
| 2021/0049460 A1* | 2/2021 | Ahn | G06N 3/006 |
| 2022/0303206 A1* | 9/2022 | Saxena | H04L 43/50 |

* cited by examiner

*Primary Examiner* — Jerry B Dennison
(74) *Attorney, Agent, or Firm* — Hauptman Ham, LLP (57) ABSTRACT

A method includes causing, by a processor, a graphical user interface (GUI) to be output by a display. The GUI includes a first user input field identifying a target key performance indicator (KPI) associated with a network. A second user input field identifying a KPI peak-usage frequency. A third user input field identifying a peak-usage relationship. The method also includes creating a first monitoring profile based on the target KPI for the KPI peak-usage frequency for the peak-usage relationship. Storing the first monitoring profile. Monitoring the target KPI for the KPI peak-usage frequency based on the first monitoring profile. Collecting target KPI data over a period defined by the KPI peak-usage frequency. Determining a peak-usage during the period defined by the KPI peak-usage frequency based on the collected target KPI data. Periodically reporting peak-usage data based on the first monitoring profile.

20 Claims, 7 Drawing Sheets

MONITORING PROFILE DASHBOARD
404

| | Domain | Vendor | Technology | Node | Frequency | Type | KPI Name |
|---|---|---|---|---|---|---|---|
| 402a | RAN | XYZ | 5G | GNB_CELL | Weekly BBH | Type1 | Bandwidth Peak Usage |
| 402b | RAN | ABC | LTE | IDSC | BBH | Type1 | User Peak Usage |
| 402c | RAN | XYZ | LTE | RIUD | BBH | Type1 | Hourly |
| 402d | RAN | XYZ | LTE | Cell | BBH | Type1 | Quarterly |
| 402e | RAN | ALL | ALL | ALL | BBH | Type1 | MWF |
| 402f | RAN | ABC | LTE | IDSC | BBH | Type2 | Sat-Sun |
| 402g | RAN | ALL | ALL | ALL | NBH | Type2 | Daily |

USER-DEFINED NETWORK CONGESTION MONITORING SYSTEM

BACKGROUND

Network service providers (e.g., wireless, cellular, fiber, and the like) are continually challenged to deliver value and convenience to consumers by, for example, providing network services that are dependable and capable of being flexibly constructed, scalable, diverse, and economically operated. To provide such network services, service providers often track key performance indicators (KPIs) that are indicative of an operating state of the network.

A performance indicator or KPI is a type of performance measurement. KPIs allow for evaluation of the success of a particular activity. Often success is simply the repeated, periodic achievement of levels of an operational goal (e.g. zero defects, 10/10 customer satisfaction, and the like), and sometimes success is defined in terms of making progress toward strategic goals. Accordingly, choosing the right KPIs to monitor relies upon a good understanding of what is important to the organization or the user assigned to evaluate network performance. What is deemed important often depends on the organization or the user assigned to evaluate network performance measuring the performance. Assessments often lead to the identification of potential improvements, so performance indicators are routinely associated with performance improvement initiatives.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact, and also include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In some embodiments, a system includes a processor and a memory that includes instructions stored thereon that, when executed by the processor, cause a graphical user interface (GUI) to be output by a display. In some embodiments, the GUI includes a user input field configured to receive a user input identifying a target KPI associated with a network. In some embodiments, the GUI includes a user input field configured to receive a user input identifying a KPI peak-usage frequency. In some embodiments, the GUI includes a user input field configured to receive a user input identifying a peak-usage relationship. In some embodiments, the instruction execution further includes creating a monitoring profile based on the target KPI for the KPI peak-usage frequency for the peak-usage relationship. In some embodiments, the instruction execution further includes storing the monitoring profile. In some embodiments, the instruction execution further includes monitoring the target KPI for the KPI peak-usage frequency based on the monitoring profile. In some embodiments, the instruction execution further includes collecting target KPI data over a period defined by the KPI peak-usage frequency. In some embodiments, the instruction execution further includes determining a peak-usage during the period defined by the KPI peak-usage frequency. In some embodiments, the instruction execution further includes periodically reporting peak-usage data based on the monitoring profile.

Implementations include one or more of the following features. In some embodiments, the GUI further includes a user input field configured to receive a user input identifying one or more networks in which to monitor the target KPI associated with the one or more networks. In some embodiments, the GUI further includes a user input field configured to receive a user input identifying a communications technology in which to monitor the target KPI associated with the one or more networks. In some embodiments, the GUI further includes a user input field configured to receive a user input identifying a vendor of the communications technology in which to monitor the target KPI associated with the one or more networks. In some embodiments, the GUI further includes a user input field configured to receive a user input identifying a node included in the one or more networks in which to monitor the target KPI associated with the one or more networks. In some embodiments, the first monitoring profile includes a first target KPI during a first KPI peak-usage frequency for a first peak-usage relationship. In some embodiments, the instructions stored on the memory further cause the processor to create a second monitoring profile that includes a user input identifying a second target KPI associated with one or more networks. In some embodiments, the instructions stored on the memory further cause the processor to create a second monitoring profile that includes a user input identifying a second KPI peak-usage frequency. In some embodiments, the instructions stored on the memory further cause the processor to create a second monitoring profile that includes a user input identifying a second peak-usage relationship. In some embodiments, the instructions stored on the memory further cause the processor to, before the first monitoring profile is created, determine whether a stored monitoring profile matches the first monitoring profile has been created previously. In some embodiments, the instructions stored on the memory further cause the processor to, responsive to the first monitoring profile being created previously, cause the GUI to further include a warning message field configured to present information to indicate the first monitoring profile has been previously created. In some embodiments, a user input field is configured to receive a user input selecting the stored monitoring profile that matches the first monitoring profile. In some embodiments, the instructions stored on the memory further cause the processor to determine whether user authorization exists to allow for the stored monitoring profile to be monitored. In some embodiments, the instructions stored on the memory further cause the processor to create a watch list that includes each user-created monitoring profile and/or user-selected monitoring profile.

Network services are often provided by static or inflexible systems that are difficult to configure, scale, and deploy over various target areas. Dependable network systems and/or network services that are capable of being flexibly constructed, scalable and diverse are often reliant on the collection, analysis and reporting of information regarding multiple network functions, network services, network devices, or the like that affect the performance, accessibility, configuration, scale, and/or deployment of a communication network, various network functions, network services, and the like.

Network service providers often deploy network monitoring systems that track a KPI of an aspect of the network for determining how well that aspect and/or the network is performing. Such KPIs include, without limitation, network availability (uptime), network mean time between failures, network mean time to repair, network unplanned availability, network unplanned downtime, network average time to repair, and the like.

For example, when a peak-usage KPI value for a certain network feature is below a threshold, the KPI value implies that the network is operating normally. On the other hand, when the KPI peak usage value is above or equal to the threshold, the KPI value implies that the network is operating below expectation, which in turn indicates that some unexpected event (such as a hardware failure, capacity overload, a cyberattack, or the like) has occurred. Accordingly, a series of actions are carried out by the monitoring system such as alerting the network operator, shifting a network function from a problematic server to a healthy server, temporarily shutting down the network, or some other suitable action.

For example, a network developer desires to develop a network service in a new location. Though determining the peak usage time of the network service in another location, the network developer effectively plans the network infrastructure in the new location. In another example, by monitoring the peak usage time of KPI(s), a network traffic engineer determines and plans necessary network capacity for a network service to ensure stability of the network. In another example, by monitoring a peak usage time of a network element, the network security admin determines unusual usage in the network element and takes preventive action on any potential security threat. In another example, by knowing the peak usage time of a network element on a specific location, the business unit determines the data usage trend for the specific location and customizes a business strategy for that specific location (e.g., present online advertisement associated to the specific location during the peak data usage time, and the like).

A network system is constructed from multiple network elements, each of which contains multiple functionalities. Each functionality of each network element is configured to be presented in the form of a KPI. Monitoring the time of peak usage of a KPI of a network element is an aspect of network monitoring, since such information offers important insights of a telecommunication network system, in terms of both engineering and business perspective.

In other approaches, there are two basic types, a one size fits all, of peak usage time monitoring in telecommunication network systems. A bouncing busy hour (BBH) is the peak usage hour a KPI over 24 hours or one day. The hour in which the highest usage is measured for any day or 24-hour period. The readings are on an hourly basis. The selected clock hour varies from day to day, depending on the measured usage.

A network busy hour (NBH) is the peak usage hour of the whole network system in one day or 24-hour period. In traditional telecommunication network systems, the entire network system is controlled by a network operator and the network elements are proprietary or optimized by specific vendor(s). The network information (including the peak-usage busy hour(s) of network elements) are monitored by a few parties involved in a network system. The network operator and/or the specific vendors monitor and collect the network information, and when someone requests busy hour(s) information for a specific KPI, the monitoring party extracts the requested information from the collected network information and provides the peak usage information to the requesting party.

Both BBH and NBH provide a peak-usage KPI that represents the busiest hour per day or on a rolling average over 24 hours. Thus, other approaches are limited to a peak usage hour (in a node or network) over a 24 hours period. Thus, at worst a requesting party waits 24 hours and at best the requesting party waits 1 hour for the peak-usage KPI information.

As telecommunication network systems evolve and improve, the parties involved in a single network system significantly increase. One network service able to be provided by multiple vendors. One vendor provides multiple network services, one network operator partially or completely operates multiple network systems on one or more locations. A user freely selects from which vendor(s) a network service is provided based on preference. Vendors want to monitor the busy time (peak usage) of a network service in order to propose modification of current services or to plan for new services which are more attractive to the user. The network operator wants to monitor the busy time to ensure sufficient network traffic for maintaining network stability or to plan for development of new network systems in other locations, or the like. The number of requests for busy hour(s) and peak usage information significantly increases, and the requests are very different from each other as different KPIs affect different vendors differently.

Furthermore, due to the fact that the network status varies dynamically, monitoring the peak usage according to the base-hour or base-sixty minutes are limiting and not sufficient for some users. For example, in network security related matters, detection and resolution of security threats as soon as possible is desirable. Thus, monitoring the BBH and NBH is not suitable since the KPIs show the hour of the peak usage after an hour at the minimum and that is too late to resolve said security threats by the time BBH and NBH are detected.

When monitoring network states, often a single user monitors multiple KPIs at the same time, such as: KPIs of a similar aspect of a network for different locations, KPIs of different aspects of the network for one location, or a combination thereof. Sometimes, a user desires to monitor one KPI differently for different locations (e.g., monitoring busy hours for Tokyo and busy days in Hokkaido, and the like).

In addition, when multiple users are involved in monitoring KPIs of the network system, the definition of normal and abnormal are different according to the user or the user's role with respect to monitoring the network. Some users monitor the same KPI, but each user wants to configure a monitoring of a particular KPI for a different time frame (e.g., busy second, busy minute, busy hour, busy day, busy week, busy month, busy year, or the like). Furthermore, each user wants to configure a monitoring of a particular KPI in a different time frame wrapped within a time frame (e.g., busy second within five minute periods, busy minute every half-hour, busy hour on weekends, busy day during a work week, busy week leading up to a holiday, busy month in a year, busy year in a decade, or the like). Other approaches do not provide a network monitoring system that allows a user to customize multiple KPIs over varying time periods and varying networks.

Figure 1:
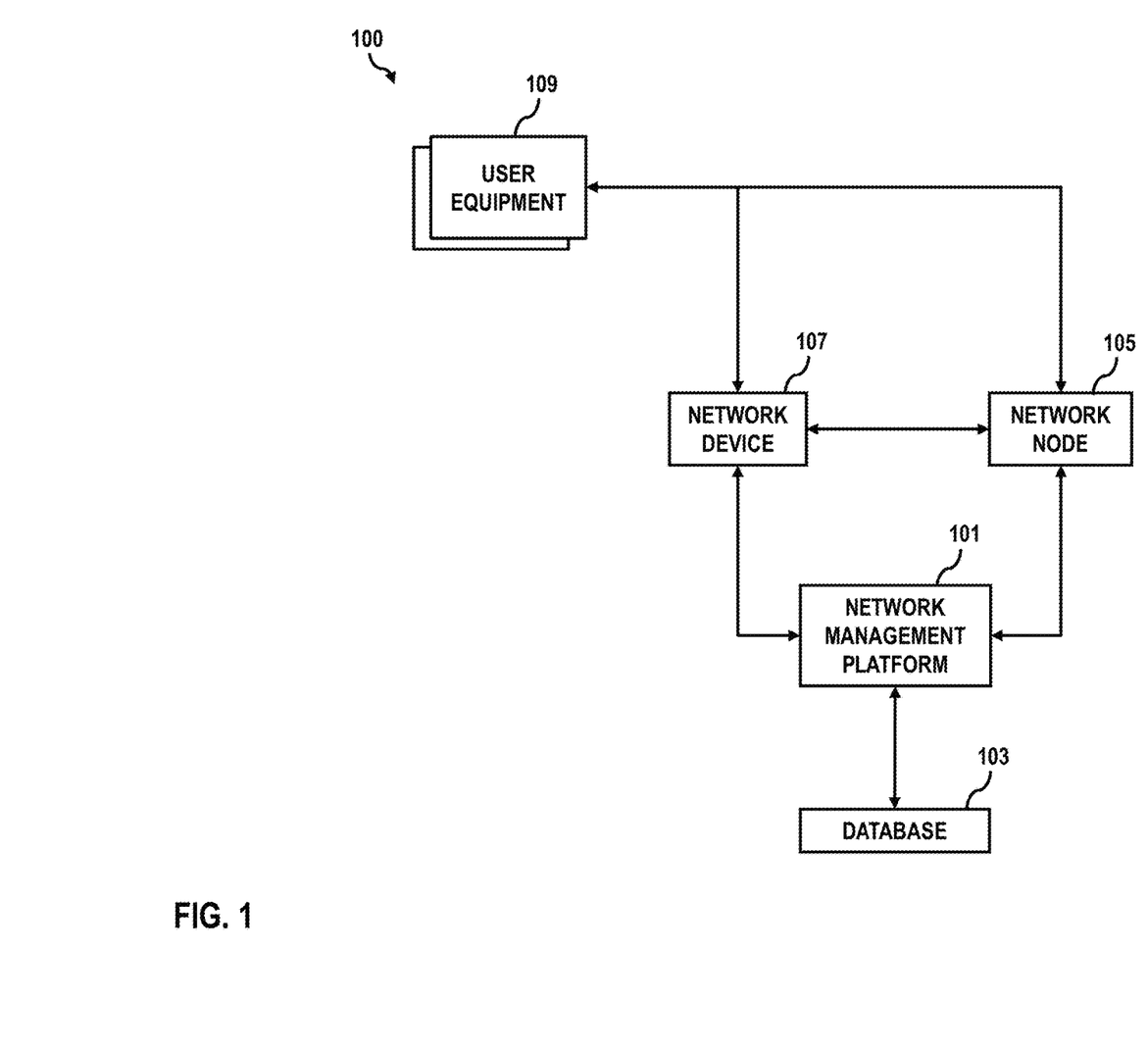
FIG. 1 is a diagram of a network monitoring system that facilitates temporal-based network monitoring and generating one or more KPI management profiles, in accordance with one or more embodiments.

FIG. 1 is a diagram of a network monitoring system 100 that facilitates temporal-based network monitoring and generating one or more KPI management profiles, in accordance with one or more embodiments.

The dynamic temporal-based network monitoring system 100 discussed with respect to FIG. 1 helps to resolve the issues discussed above. In some embodiments, the system 100 is configured so that a user is no longer dependent on network operators and/or vendors to provide requested KPIs. In contrast, a monitoring configuration profile (e.g., "KPI monitoring profile") defining the KPIs, network, periodicity, and the like intended by the user to be monitored, and create an a temporal value associated with the monitoring profile for one or more KPIs.

In some embodiments, the system 100 is free from having any pre-set KPI monitored profiles stored therein. Instead, the system 100 is configured to maintain user-configured KPI management profiles that define target KPIs that are to be monitored and various parameters regarding the target KPIs that are to be monitored. In some embodiments, the system 100 is configured to maintain a master list of user-configured KPI management profiles that define target KPIs that are to be monitored and various parameters regarding the target KPIs that are to be monitored. In some embodiments, the system 100 is configured to maintain user-specific KPI management profiles that define target KPIs that are to be monitored and various parameters regarding the target KPIs that are to be monitored specifically for a specified user.

During network monitoring, the system 100 is, in accordance to the monitoring configuration specified in the KPI management profiles, configured to compare current KPI data over a selected period of time based on the user's defined peak usage periodicity. In some embodiments, the system 100 stores a temporary peak-usage KPI value until a new peak-usage value is discovered within the time periodicity defined by the user. System 100 will retain this temporary peak-usage KPI for comparison to determine whether or not the differences between the temporary peak-usage KPI data and the overall KPI historical data supersedes the temporary peak-usage KPI data fulfilling conditions defined by one or more parameters as configured in a KPI management profile. In some embodiments, once the comparison and determination is complete, the temporary peak-usage KPI data is superseded by a new peak-usage KPI and is stored as the new peak-usage value for the periodic comparison.

In some embodiments, system 100 is free from a network operator and/or vendor monitor and collects KPI information to allow a user(s) to create and update KPI monitoring profiles for each KPI, network, network vendor, network operator, periodicity, and the like. System 100 includes a network management platform 101, a database 103, one or more network nodes 105, and one or more network devices 107.

Network management platform 101 is configured to generate one or more KPI management profiles based on one or more parameters input by a user for tracking and/or identifying network performance. In some embodiments, network management platform 101 receives KPI data from one or more of a network node 105, a network device 107 such as a radio station, a radio frequency (RF) emitter, radio access network (RAN), and user equipment 109 or other suitable network component which is configured to communicate data to the network management platform 101 via a network protocol stack, corresponding protocol layer logs, or direct communication when identifying a current operating state of the network based on KPI data stored in, for example, database 103.

Figure 5:
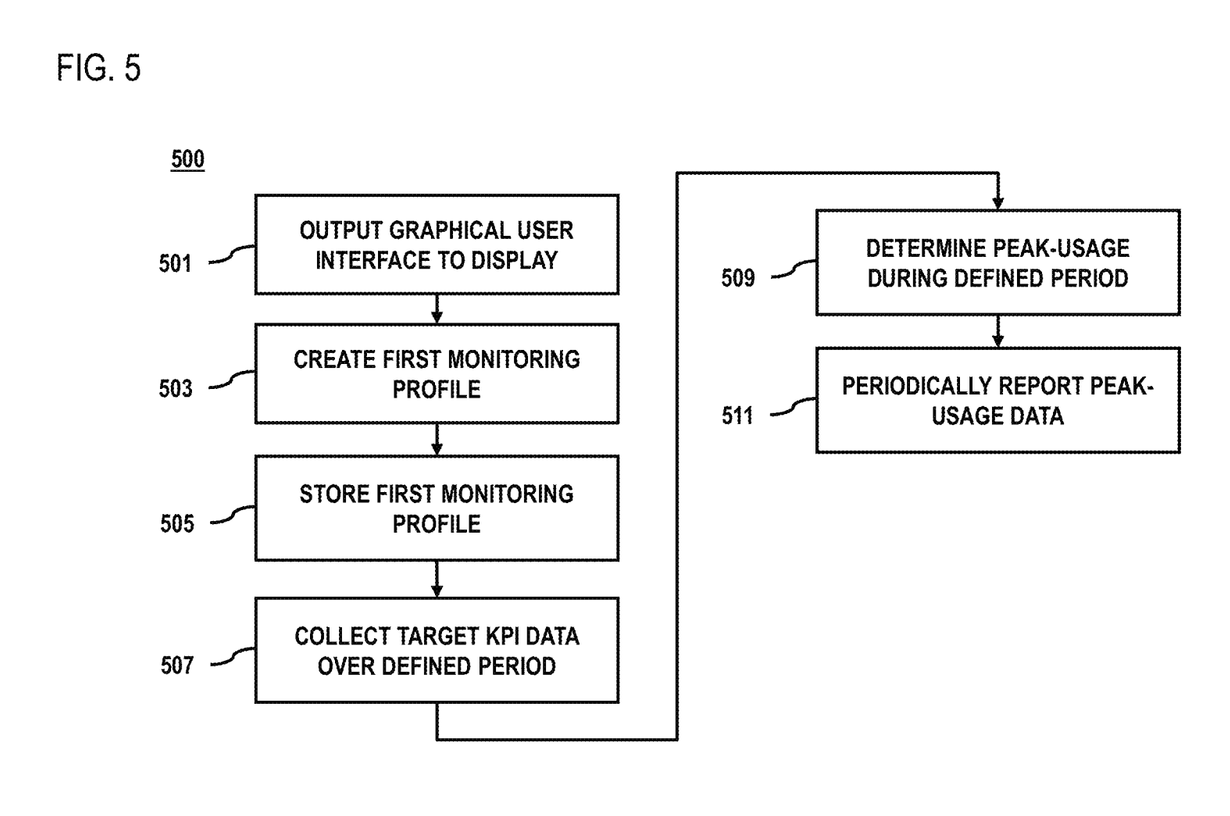
FIG. 5 is a flowchart of a process for targeted KPI network monitoring and generating one or more KPI management profiles, in accordance with one or more embodiments.

In some embodiments, network node 105 is an evolved node B (eNB) in fourth generation (4G), a fifth generation (5G) logical node (gNB), a new radio (NR) base station, and edge device (such as a router, routing switch, integrated access device, multiplexer, metropolitan area network (MAN) device, wide area network (WAN) device, or the like) or other suitable node. In some embodiments, network management platform 101 includes a set of computer readable instructions that, when executed by a processor such as a processor 603 (FIG. 6), causes network management platform 101 to perform the processes discussed in accordance with one or more embodiments or methods, such as method 500 (FIG. 5). In some embodiments, network management platform 101 is remote from the network node 105 and the network device 107. In some embodiments, network management platform 101 is a part of one or more of the network node 105 or the network device 107. In some embodiments, one or more processes of the network management platform 101 is configured to be divided among one or more of the network node 105 or the network device 107 and a processor, such as processor 603, remote from the network node 105 and/or the network device 107. In some embodiments, the network management platform 101 is at least partially implemented by a UE 109.

In some embodiments, database 103 is a centralized network repository having searchable information stored therein that includes historical KPI data, rules defining various KPIs, master KPI monitoring profiles, KPI monitoring profiles by specific user, network functions capable of being implemented in the network involving one or more of network usage, timing, connected devices, location, network resource consumption, cost data, example network KPIs, KPI management profiles corresponding to one or more users, predefined KPI management templates accessible to be applied by one or more registered users, or other suitable element or information upon which a peak-usage KPI management profile is capable of being defined and/or one or more KPIs capable of being defined. Database 103 is a memory such as a memory 605 (FIG. 6) capable of being queried or caused to store data in accordance with one or more embodiments.

In some embodiments, network management platform 101 generates a GUI 200 (FIG. 2A) that is output to a display 611 (FIG. 6) by way of a UE 109 or a terminal, such as network device 107, associated with network management platform 101 for a user (e.g., a network operator, a network vendor, and any personnel responsible for monitoring the network). GUI 200 allows the user to input or select parameters for one or more target KPI(s). Network management platform 101 generates a KPI management profile specified by the user based on one or more parameters inputted or selected by the user, and causes the KPI management profile to be stored in database 103. In some embodiments, network management platform 101 causes the KPI management profile to be stored in a server, in a memory of a UE 109, or some other suitable location.

In some embodiments, UEs 109 are a computer or computing system. Additionally or alternatively, UEs 109 have a liquid crystal display (LCD), light-emitting diode (LED) or organic light-emitting diode (OLED) screen interface, such as user interface (UI) 607 (FIG. 6), providing a touchscreen interface with digital buttons and keyboard or physical buttons along with a physical keyboard. In some embodiments, UE 109 connects to the Internet and interconnect with other devices. Additionally or alternatively, UE 109 incorporates integrated cameras, the ability to place and receive voice and video telephone calls, video games, and Global Positioning System (GPS) capabilities. Additionally or alternatively, UEs run operating systems (OS) that allow third-party apps specialized for capabilities to be installed and run. In some embodiments, UEs 109 are a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

Subsequently, the network management platform 101 generates a peak usage value from historical KPI values of the one or more selected target KPI(s), based on the configurations specified in the KPI management profile. The network management platform 101 then compares current KPI data of the target KPI(s) to the peak usage value, and determines whether or not the difference(s) between the current KPI peak usage data is greater than the previous peak usage value during a periodicity set by the user. The network management platform 101 then performs an appropriate action according to the KPI management profile.

When new target KPI monitoring profile is received by network management platform 101, network management platform 101 considers whether a previous target KPI monitoring profile matching the new target KPI monitoring profile currently exists. Network management platform 101 determines whether the desired KPI management profile already exists within database 103, creates the new target KPI management profile if the profile does not already exist, allows the user to access the target KPI management profile already existing when the user has security access to the KPI, and adds the KPI management profile to a user's KPI watch list. In some embodiments, once a target KPI management profile is created, network management platform 101 is configured to continuously monitor the target KPI(s) on the user's behalf. In some embodiments, network management platform 101 periodically reports the results of the monitored target KPI to the user. In some embodiments, the periodical reporting occurs based upon the periodicity selected by the user. In a non-limiting example, when a user desires to know the peak hourly usage of a node over a three day period, network management platform 101 presents a report to the user every hour when a new 72-hour period has been completed.

In some embodiments, the network management platform 101 is configured to enable a user to create multiple KPI management profiles for one target KPI, to create one KPI management profile for multiple target KPIs, or to create multiple KPI management profiles for multiple target KPIs. Accordingly, the network management platform 101 monitors multiple target KPIs at multiple networks and/or nodes, over varying time periods with varying time reporting or periodicity reporting parameters.

In some embodiments, the network management platform 101 is configured to enable multiple users to create corresponding target KPI management profile(s). In such a configuration, network management platform 101 simultaneously monitors the target KPI(s) for multiple users and performs actions, such as periodically reporting, corresponding to each user's KPI management profile.

In some embodiments, network management platform 101 is configured to identify a target KPI based on the third-generation partnership project (3GPP) protocols or similar protocol logs in a telecom network. A network node 105, for example, captures said protocol logs, counter information or a traffic pattern schema of live telecom traffic in the communication system. In this example, the network node 105 is a first entity to capture the protocol logs or traffic pattern using the 3GPP protocol stack, and extracts call process messages such as L1, L2, L3, non-access stratum (NAS) layer, telecom network intelligence messages, counter or KPI data, or other suitable protocol messages for a user defined time session or roll over period (ROP). The protocol logs are communicated to the network management platform 101 via open operation and maintenance (O&M) interfaces, for example, O-RAN interfaces, or other suitable interface for processing by network management platform 101 and storage in database 103.

In some embodiments, network monitoring system 100 is configured to allow a user to monitor, determine, and receive reports of peak-usage (e.g., busy-second, busy-minute, busy-hour, busy-day, busy-week, busy-month, busy-year, or the like) of multiple target KPIs of multiple networks and/or network elements in a user's preferred manner. In some embodiments, network monitoring system 100 is configured to implement a user interface (UI) 607 (FIG. 6) that allows a user to select one or more target KPIs based on desired information (e.g., vendors, type of domains, type of technologies, type of KPI, peak usage over a selected period of time, and other suitable information in accordance with some embodiments). In some embodiments, the user selected configuration will be stored as a monitoring profile, and based on the monitoring profile network monitoring system 100 continuously monitors, collects, determines, and periodically reports the peak usage of the selected target KPIs to the user.

In other approaches, due to the fact that the network status varies dynamically, monitoring only the peak usage in terms of base one hour increments over 24 hours is limiting and insufficient for some users. For example, in network security related matters, detection and resolution of security threats as soon as possible is helpful. Thus, monitoring the BBH and NBH, by themselves, as BBH and NBH operate in base one-hour increments for peak usage and are inadequate to resolve security threats by the time BBH and NBH were detected.

Thus, other approaches for peak-usage monitoring are ineffective and unsuitable to be used. In some embodiments, a centralized network peak-usage monitoring system 100 allows multiple users to effectively monitor peak-usage user-determined time periods of their desired KPI(s), regardless of their location and requirement. The user determined time periods monitor the peak usage of target KPIs in terms of seconds, minutes, hours, days, weeks, months, years, and the like. In some embodiments, the peak-usage monitoring of a target KPI is monitored by multiple users. In some embodiments, in order to avoid multiple monitoring profiles being created for one target KPI (e.g., which will result in wastage of network resources), a prevention measure is incorporated to ensure only one monitoring profile with the same configuration is created for one KPI.

Figure 2A:
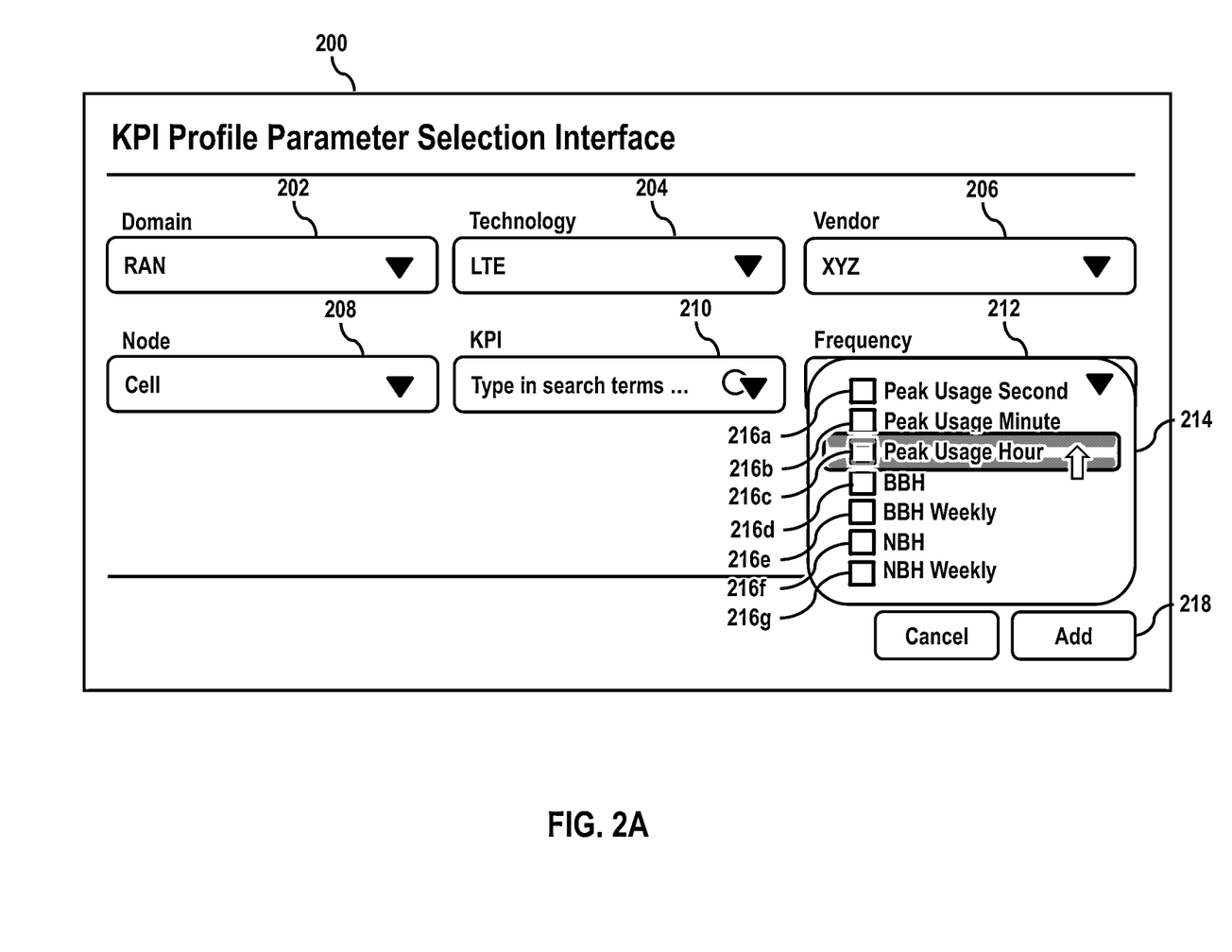
FIG. 2A is a pictorial representation of a graphical user interface (GUI), in accordance with one or more embodiments.

FIG. 2A is a diagram of a graphical user interface (GUI) 200, in accordance with one or more embodiments.

Figure 6:
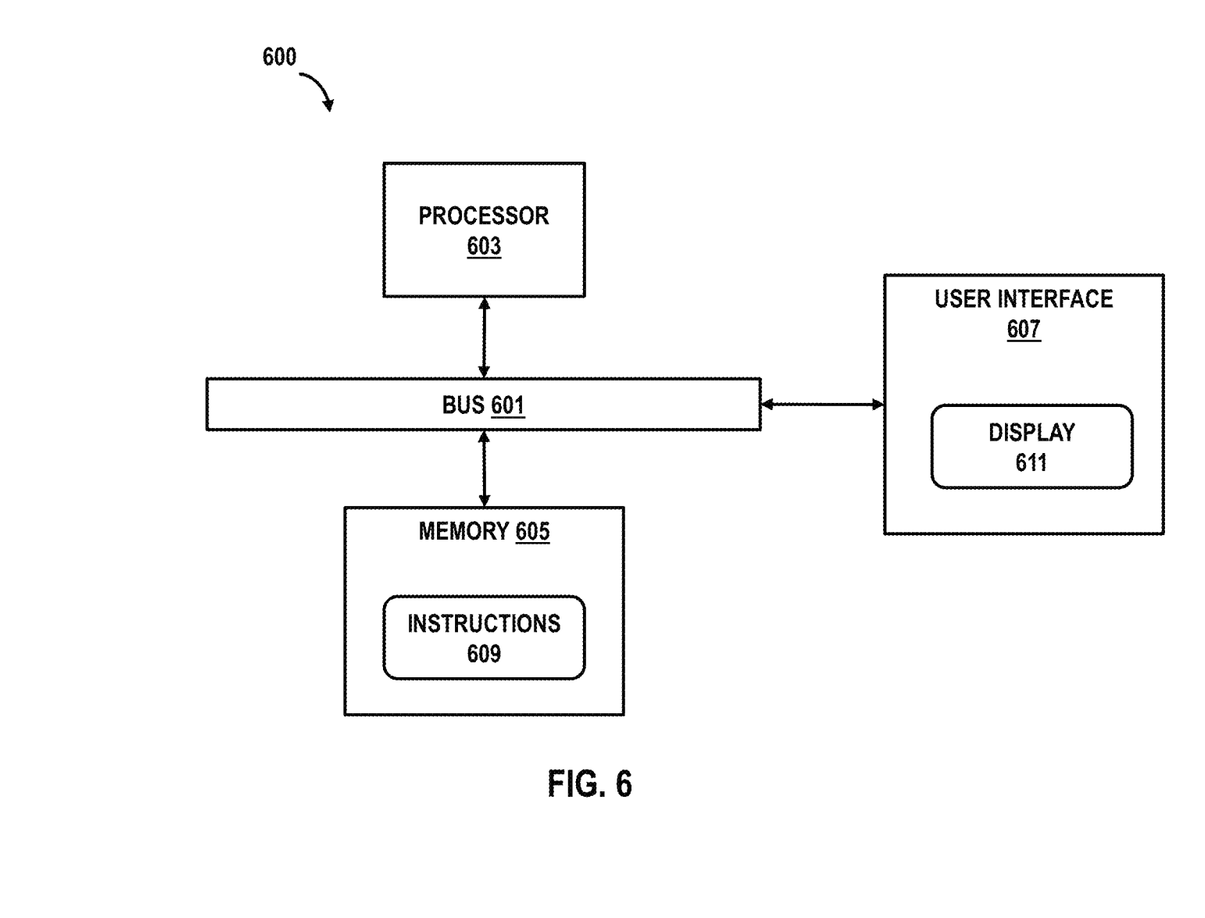
FIG. 6 is a functional block diagram of a computer or processor-based system upon which or by which some embodiments are implemented.

Network management platform 101 is configured to cause GUI 200 to be output to a display 611 (FIG. 6). GUI 200 is a form of UI, such as UI 607, that allows users to interact with electronic devices through graphical icons and audio indicators such as primary notation, in addition to text-based user interfaces, typed command labels or text navigation. The actions in a GUI are usually performed through direct manipulation of the graphical elements. GUI 200 is used in any handheld mobile devices, such as UE 109, network device 107, MP3 players, portable media players, gaming devices, smartphones and smaller household, office and industrial controls, and the like.

GUI 200 includes a domain field 202 configured to receive a user input identifying a target domain for a desired KPI monitoring profile. In some embodiment, a user is able to select, for example, from a RAN, a Core network, or any suitable domain in a telecommunications network.

GUI 200 includes a technology field 204 configured to receive a user input identifying a technology for a desired KPI monitoring profile. In some embodiments, a user is able to select from long term evolution (LTE), LTE advanced, LTE advanced Pro, 4G (fourth generation), 5G (fifth generation), 5G NR (New Radio), IP multimedia subsystem (IMS), universal mobile telecommunications system (UMTS), 3G (third generation), global system for mobile communications (GSM), 2G (second generation), and any suitable telecommunication technology.

GUI 200 includes a vendor field 206 configured to receive a user input identifying a vendor providing service through the technology on the domain. In some embodiment, a user is able to select this parameter from any available vendors.

GUI 200 includes a node field 208 configured to receive a user input identifying a node within the domain. In some embodiments, a user is able to select a network node, such as network node 105, which is an evolved node B (eNB) in fourth generation (4G), a fifth generation (5G) logical node (gNB), a new radio (NR) base station, edge device, or other suitable node.

GUI 200 includes a target KPI input field 210 configured to receive a user input identifying a target KPI associated with network 100. In some embodiments, a user is able to select from KPIs such as peak data rate, peak spectral efficiency, peak data rate experienced by the user, peak area traffic, peak latency, peak connection density, peak energy efficiency, peak reliability, peak mobility, peak mobility interruption time, peak bandwidth, or any other suitable KPI.

In some embodiments, in addition to creating a monitoring profile, such as in operation 503, for each of the selected KPI, a target KPI is automatically selected based on the inputs in user input fields 202-210. In a non-limiting example, a target KPI is selected by receiving a first user input in user input field 202. Based on the user input in user input field 202, possible parameter(s) are presented to the user as recommendation (e.g., in the form of drop-down list, or other suitable presentation) to the user in user input field 204 based on the user input in user input field 202. Based on the user input in user input field 204 or user input fields 202 and 204, process 500 determines possible parameter(s) for input field 206 and presents the possible parameter(s) as recommendations (e.g., in the form of drop-down list, or other suitable presentation) in the user in user input field 206. Based on the user input in user input field 206 or user input fields 202, 204 and 206, process 500 determines the possible parameter(s) for input field 208 and presents such possible parameter(s) as recommendation (e.g., in the form of drop-down list, or other suitable presentations) to the user in user input field 208. Based on the user input in user input field 208 or on user inputs in user input fields 202, 204, 206 and 208, process 500 determines the possible parameter(s) for input field 210 and present such possible parameter(s) as recommendation(s) (e.g., in the form of drop-down list, or other suitable presentations) to the user in user input field 210. Thus, in some embodiments, process 500 determines the target KPI based on the user input in user input field 210 based upon prior user inputs into user input fields 202, 204, 206 and 208.

GUI 200 includes a frequency field 212 configured to receive a user input identifying a frequency the user desires to monitor the peak usage of the KPI. In some embodiments, in response to a user selecting frequency field 212, a periodicity field 214 is presented to the user. For example, the user has the ability to select a KPI peak usage every second field 216a, a KPI peak usage every minute field 216b, a KPI peak usage every hour field 216c, a KPI BBH field 216d, a KPI BBH weekly field 216e, a KPI NBH field 216f, and a KPI NBH weekly field 216g, or any other suitable parameter identifying the frequency of the peak usage of the KPI. In some embodiments, periodicity field 214 allows the user to input/select the parameter associated with the type of peak usage time. In addition to daily BBH and weekly BBH, periodicity field 214 further allows the user to input/select peak-usage second in one minute, peak-usage minute in one hour, peak-usage hour in one day, peak-usage day in one week, peak-usage week in one month, peak-usage month in one year, and the like. In some embodiments, the default selection for peak usage is a time domain above the selected KPI monitoring time domain. In a non-limiting example, when a user selects peak-usage second field 216a the default KPI reporting time domain is over a minute (e.g., the next unit of time domain above the selected monitoring domain; seconds). Thus, continuing the example, the user receives a KPI report providing the peak-usage second in every minute.

Network management platform 101 processes the selected parameters (e.g., domain, technology, vendor, node, KPI, frequency, periodicity, and other suitable parameters) to generate a KPI management profile.

In some embodiments, a network monitoring system 100 includes a processor 603 (FIG. 6) and a database 103 or memory 605 (FIG. 6) having instructions 609 (FIG. 6) stored thereon that, when executed by processor 603, cause GUI 200 to be outputted by a display 607 (FIG. 6). GUI 200 includes a user input field 210 configured to receive a user input identifying a target key performance indicator (KPI) associated with a network. A user input field 212 is configured to receive a user input identifying a KPI peak-usage frequency. A user input field 214 is configured to receive a user input identifying a peak-usage relationship. The processor execution further includes: creating a monitoring profile based on the target KPI for the KPI peak-usage frequency for the peak-usage relationship (e.g., periodicity); Storing the monitoring profile, such as in database 103 or memory 605; Monitoring the target KPI for the KPI peak-usage frequency based on the monitoring profile; Collecting target KPI data over a period defined by the KPI peak-usage frequency; Determining a peak-usage during the period defined by the KPI peak-usage frequency based on the collected target KPI data; Periodically report peak-usage data based on the monitoring profile.

In some embodiments, network monitoring system 100 includes a UI 607 which allows multiple users to access to GUI 200, regardless of their location, and select one or more desired KPIs from, for example, target KIP field 210. Subsequently, a monitoring profile for each of the selected KPI, domains, technology, vendor, node, and frequency is created. In some embodiments, during creation of the monitoring profile, network monitoring system 100 presents message 250 (FIG. 2B) to the user if a monitoring profile with the same configuration for the user-selected KPI monitoring profile has already been created. In response to a determination that a KPI monitoring profile has already been created and the user is authorized to monitor the KPI monitoring profile, network monitoring system 100 will present a message (e.g., the same configuration profile has been created; add the existing configuration profile to your watch list?) to inform the user, and then direct the user to the already created monitoring profile.

Figure 2B:
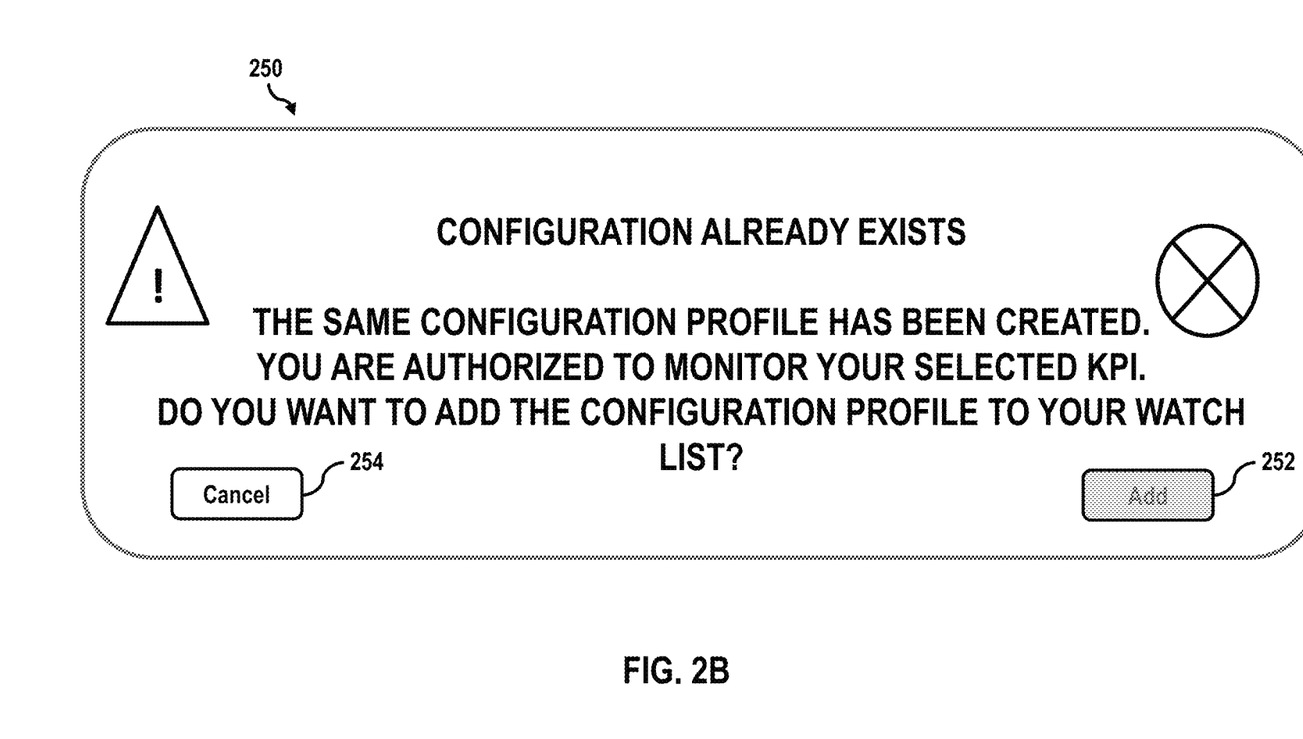
FIG. 2B is a pictorial representation of a GUI warning message, in accordance with one or more embodiments.

In some embodiments, the user selects add button 252 to add the created monitoring profile and cancel button 254 to reject the existing KPI monitoring profile. In some embodiments, the user double clicks on a displayed existing KPI monitoring profile or drag-and-drops the already created monitoring profile into the watch list (FIG. 4), or the like.

In response to network monitoring system 100 determining that the user is not authorized to monitor the KPI monitoring profile, network monitoring system 100 will present a message (e.g., you do not have authority to monitor this KPI. Please contact the network admin to request for authority) to inform the user.

Figure 4:
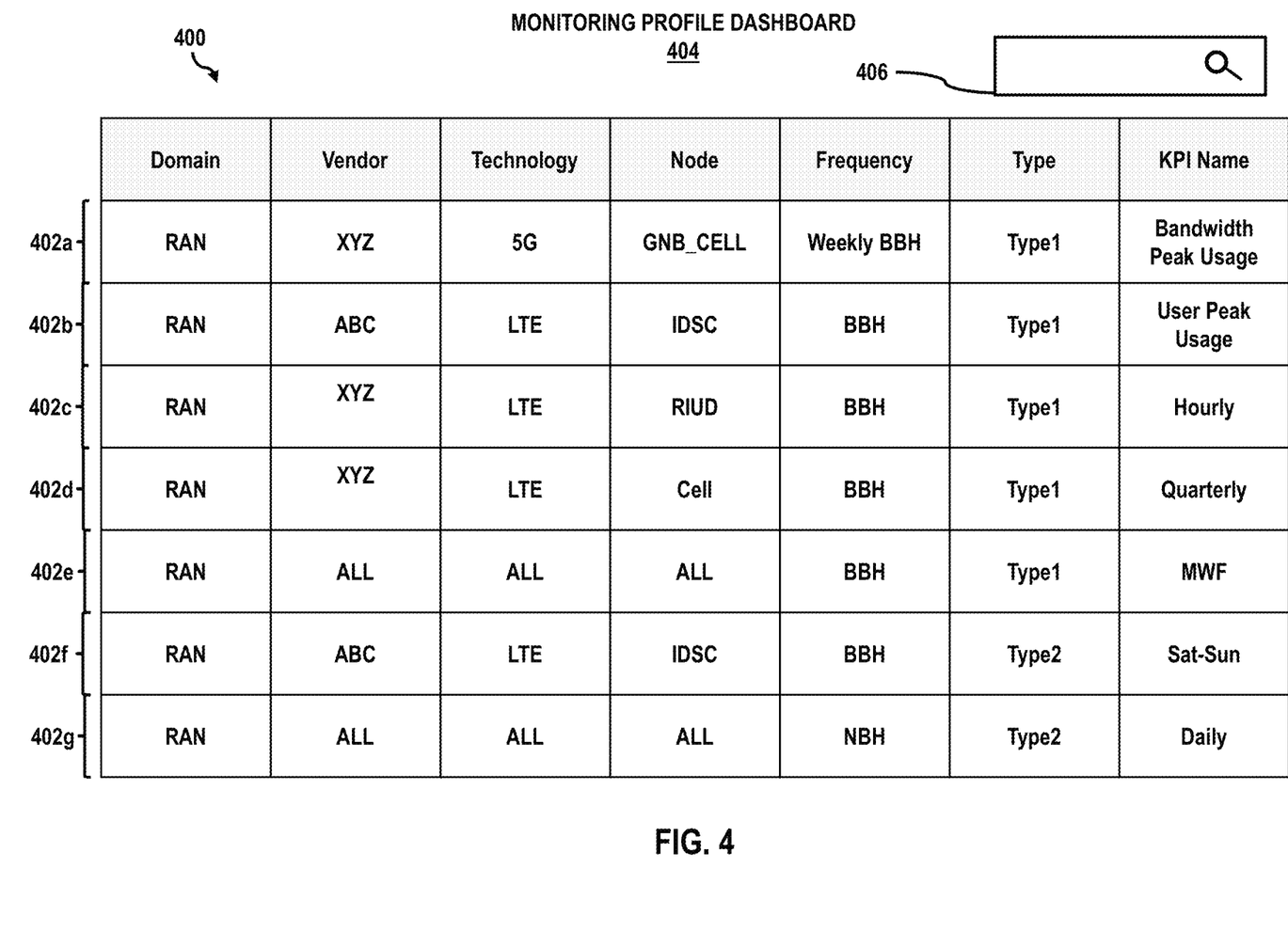
FIG. 4 is a pictorial representation of a GUI watch list, in accordance with one or more embodiments.

In some embodiment, in response to network monitoring system 100 determining that a KPI monitoring profile has not yet been created, the network monitoring system 100 creates a new targeted KPI monitoring profile and adds the targeted KPI monitoring profile to the user's watch list, without presenting a message to inform the user. In some embodiments, in response to network monitoring system 100 determining that a KPI monitoring profile has not yet been created, network monitoring system 100 will present a message (e.g., no existing monitoring profile is found; do you want to create a new monitoring profile?) to inform the user. Subsequently, in response to the user desiring to create a new monitoring profile, the user is able to click on add button 218. In response, network monitoring system 100 creates a new targeted KPI monitoring profile and adds the targeted KPI monitoring profile to the user's watch list (FIG. 4).

In some embodiments, to add a monitoring profile, such as monitoring profiles 402a, 402b, 402c, 402d, 402e, 402f, and 402g to watch list 400 (FIG. 4), a user accesses a monitoring profile dashboard 404, which contains monitoring profiles available to the user (e.g., due to security and/or privacy reason, some users are unable to monitor peak usage of some specific KPI(s) from some vendors, location, technologies, or the like).

In some embodiments, the user inputs (e.g., in a search window 406, a search bar, or the like) parameter(s) (e.g., keyword, full terms, ID, or the like) of a targeted KPI monitored profile to search for the targeted KPI monitored profile. In some embodiments, network monitoring system 100 searches for the requested targeted KPI monitoring profile based on the user's input. In response to network monitoring system 100 locating the monitoring profile of interest and determining the user has permission to view the KPIs, the user is able to add the targeted KPI monitoring profile to the users' watch list, such as watch list 400, so that network monitoring system 100 periodically reports the peak-usage time of the selected targeted KPI monitored profile to the user.

Figure 3:
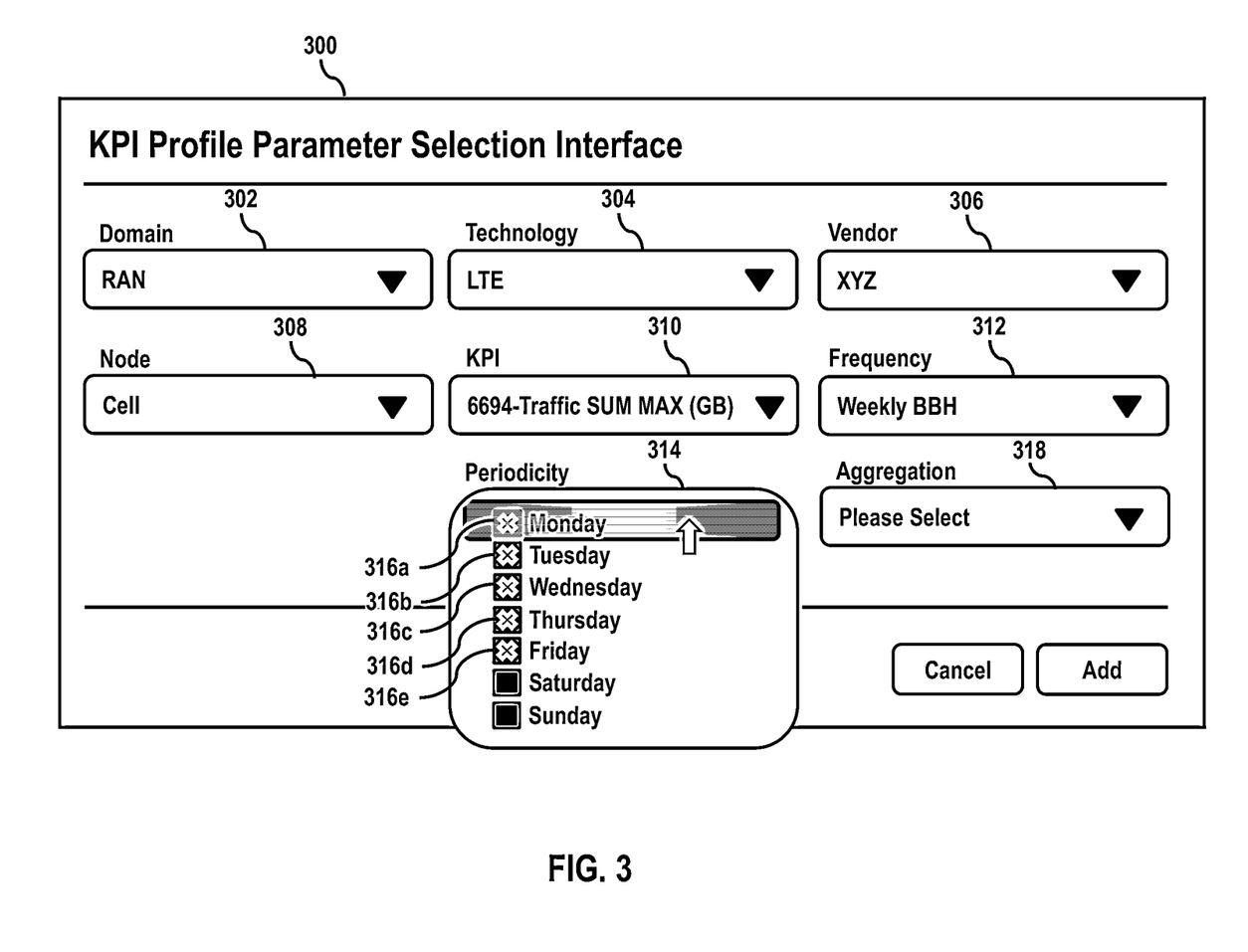
FIG. 3 is a diagram of a GUI, in accordance with one or more embodiments.

FIG. 3 is a diagram of a GUI 300, in accordance with one or more embodiments. GUI 300 is an example embodiment of GUI 200 (FIG. 2A), with similar features having the corresponding reference numerals increased by 100.

A non-transitory computer readable medium, like database 103 or memory 605, include instructions 609 stored thereon that cause a GUI 300 to be output by display 611. GUI 300 includes a user input field 302 configured to receive a user input identifying a domain. GUI 300 includes a user input field 304 configured to receive a user input identifying a technology. GUI 300 includes a user input field 306 configured to receive a user input identifying a vendor. GUI 300 includes a user input field 308 configured to receive a user input identifying a node. GUI 300 includes a user input field 310 configured to receive a user input identifying a target KPI. GUI 300 includes a user input field 312 configured to receive a user input identifying a KPI peak-usage frequency of the selected KPI. GUI 300 includes a user input field 314 configured to receive a user input identifying a peak-usage relationship or periodicity to the KPI peak-usage frequency.

In a non-limiting example, in response to a user selecting a weekly BBH at user input field 312, user input field 314 is displayed. User input field 314 allows the user to select which days of the week the user desires to monitor for the weekly BBH. Continuing on with the example, the user is unconcerned with the targeted KPI in user input field 310 on Saturdays and Sundays, but instead is interested in the targeted KPI during a work week. Thus, the user selection of input fields 316a-316e. In some embodiments, user input field 314 is dependent of the selection in user input field 312. For example, if a user selects a weekly BBH frequency in user input field 312, then user input field 314 presents which days the user desires to select for the weekly BBH. In some embodiments, a user has an option to select which weeks the user wishes to monitor a monthly BBH. For example, the user selects the first and third week of the month to perform the monthly BBH or the user wants the monthly BBH over a full month (i.e., which week had the highest peak usage over a month).

In some embodiments, a user selects an aggregation user input field 318 to select an aggregation type (e.g., maximum, minimum, average, etc.), within the periodicity of user input field 314, within the frequency of user input field 312. In a non-limiting example, when a user desires to know a maximum BBH of a node across three days in the weekdays of Monday through Friday, the user will select the desired three days (e.g., Monday, Tuesday, Wednesday, or other suitable selected days) in the user input field 314, and selects "maximum" as the aggregation type in the user input field 318. Accordingly, the system will determine a candidate BBH for each of the three selected days, and then determine which of the three candidates has the maximum value among the three candidates. Thus, a user has an almost unlimited amount of targeted KPI monitored profiles available. That is, within network monitoring system 100, a user has several KPIs to select from (based on user's inputs on input fields 302, 304, 306, 308, and/or 310). Within those many KPIs, GUI 300 is configured to allow the user to select from several monitoring frequencies in user input field 312. Within those many monitoring frequencies, GUI 300 is configured to allow the user to select which periods to be monitored in user input field 314. Within those many monitoring periods, GUI 300 is configured to allow the user to select aggregated sub-periods in user input field 318. The flexibility of targeted KPI monitoring is increased substantially with network monitoring system 100.

In some embodiments, each of the user inputs into fields 302, 304, 306, 308, 310, 312, 314, 316a-e, and 318 are stored in database 103 or memory 605 as a monitoring profile.

In some embodiments, network monitoring system 100 accesses database 103 and searches for target KPI data based on a monitoring profile. In a non-limiting example, in response to the monitoring profile being a daily BBH of a KPI X for Day Y, network monitoring system 100 searches and collects all data of KPI X available in Day Y and determines from the collected data an hour Z in which KPI X has a peak usage (e.g., highest value, or the like).

In some embodiments, the network monitoring system 100 extracts the data of KPI X collected in hour Z of Day Y and then reports or presents the extracted data as the daily BBH of KPI X for Day Y. In other non-limiting examples, a weekly BBH is performed (i.e., an hour in which the targeted KPI has the highest usage in the week). Thus, a peak hourly usage over a seven-day period is determined and reported to or presented to the user. In other non-limiting examples, a BBH is reported monthly, quarterly, yearly, and the like.

In some embodiments, the peak usage for any target KPI is monitored. In a non-limiting example, a daily NBH, weekly NBH, monthly NBH, yearly BBH, and the like is selected by the user. In some embodiments, the peak usage is set to be reported or presented based upon the equation: peak usage of KPI X during time period Y over time period Z. In a non-limiting example, KPI X is monitored for the peak usage second over a minute for each minute. In another non-limiting example, KPI X is monitored for the peak usage minute over an hour for each hour. In another non-limiting example, KPI X is monitored for the peak usage hour over a day for each day. In a non-limiting example, KPI X is monitored for the peak usage day over a week for each week. In a non-limiting example, KPI X is monitored for the peak usage week over a month for each month. In a non-limiting example, KPI X is monitored for the peak usage month over a year for each year In some embodiments, peak usage is examined over varying amounts of time. In a non-limiting example KPI X is monitored for a peak usage second over five minutes for each five-minute period. In a non-limiting example, KPI X is monitored for the peak usage hour over three days for each three day period. In a non-limiting example, KPI X is monitored for the peak usage day on Saturdays and Sundays. In a non-limiting example, KPI X is monitored for a peak usage month from September to December.

In some embodiments, to add a monitoring profile to a watch list, such as watch list 400, a user accesses a monitoring profile dashboard, such as dashboard 404, which contains monitoring profiles available to the user (e.g., limitations due to security and/or privacy reasons, some users are unable to monitor peak usage/busy time of some specific KPI(s) from some vendors, location, technologies, or the like). In some embodiments, in response to the user creating a monitoring profile the user does not have access too, the user is unable to view the targeted KPI and will received a warning message as discussed above.

In some embodiments, a user inputs in a search bar 406 parameter(s) (e.g., keyword, full terms, ID, and the like) of a desired KPI. In some embodiments, network monitoring system 100 searches for the possible monitoring profile based on the user's input into search bar 406. In response to that monitoring profile already existing, and the user is authorized to monitor the targeted KPI, network monitoring system 100 presents message 250 (e.g., the same configuration profile has been created; do you want to add the configuration profile to your watch list?) to inform the user and then direct the user to the created monitoring profile. In some embodiments, the user thereby adds the created monitoring profile (e.g., by double clicking on the created monitoring profile, by drag-and-drop the created monitoring profile into the watch list, clicking add button 252, or the like). In response to a determination by network monitoring system 100 that the user is not authorized to monitor the KPI, the system will present a warning message (e.g., you do not have authority to monitor this KPI; please contact the network administrator to request for authority.) to inform the user.

In some embodiments, in response to network monitoring system 100 determining that a monitoring profile has not yet been created, network monitoring system 100 presents a message (e.g., no existing monitoring profile is found; do you want to create a new monitoring profile?) to inform the user. In some embodiments, in response to the user deciding to create a new monitoring profile, the user will be directed to a GUI, such as GUI 200 or GUI 300 (e.g., via pop-out window, or the like).

In some embodiments, GUIs 200 and 300 are configured for a user to creating monitoring profiles for a different type of peak-usage targeted KPI monitoring. In some embodiments, user input fields Domain (202, 302), Technology (204, 304), Vendor (206, 306), Node (208, 308), and KPI (210, 310) are configured for the user to input/select the parameters associated with the target KPI. In some embodiments, user input field Frequency (212, 312) is configured for the user to input/select the parameter associated with the type of KPI peak usage. In some embodiments, user input field 312 is configured to allow the user to select daily BBH, weekly BBH, monthly BBH, quarterly BBH, yearly BBH, a daily NBH, weekly NBH, monthly NBH, yearly BBH, busy second in one minute, busy minute in one hour, busy hour in one day, busy day in one week, busy week in one month, busy month in one year, and the like. In some embodiments, GUIs 200 and 300 comprises input fields in addition to input fields 202-212 and 302-318, so as to allow the user to further specify the parameters for monitoring profiles. In some embodiment, GUIs 200 and 300 comprises only input fields for allowing the user to select target KPI and to select type of KPI peak usage.

In some embodiments, in response to certain inputted or selected parameters, additional user input field(s) are presented. In a non-limiting example, in response to a weekly BBH being selected in user input field 312, additional user input fields 314 and 318 are presented. In some embodiments, user input field 314 is configured to allow the user to select desired time periods, such as day(s), week(s), month(s) and the like. In some embodiments, user input field 318 is configured to allow the user to input an aggregation method (e.g., max, min, average, sum, and the like). In a non-limiting example, in response to Monday (user input field 316a), Tuesday (user input field 316b), and Wednesday (user input field 316c) being selected in user input field 314 and Max being selected in user input window 318, network monitoring system 100 monitors the maximum BBH of each of Monday, Tuesday, and Wednesday, and then determines which maximum BBH has the highest value among the three. In some embodiments, network monitoring system 100 extracts the BBH which has the highest value and reports the highest value to the user as the weekly BBH.

In some embodiments, a user is able to select a large combination of peak-usage KPIs based on the user's own preference and requirement, such as: busy second in five minutes, busy hour in three days, busy day between Saturday to Sunday, busy month between September to December, and the like. In some embodiments, after creating a monitoring profile, the monitoring profile is added to the user's watch list, such as watch list 400, and network monitoring system 100 starts monitoring and reporting the peak usage/busy time of the targeted KPI(s) based on the monitoring profile. In some embodiments, network monitoring system 100 is configured to allow multiple users to monitor the desired peak usage of targeted KPIs in the user's desired manner. In some embodiments, network monitoring system 100 provides flexibility in configuring network monitoring system 100 and improve a user's experiences in monitoring the peak usage of the targeted KPIs. In some embodiments, the flexibility is realized by the user being able to add existing monitoring profile and/or create the desired monitoring profile via GUI 200 and 300.

FIG. 5 is a flowchart of a process 500 of facilitating targeted KPI monitoring and generating one or more KPI management profiles, in accordance with one or more embodiments. In some embodiments, the network management platform 101 (FIG. 1) performs the process 500 and is implemented in or by, for instance, a chip set including a processor and a memory as shown in FIG. 6.

In operation 501, a GUI is caused to be output by a display. The GUI includes one or more user input fields configured to receive a user input identifying a target KPI. The GUI also includes a user input field configured to receive a user input identifying a KPI peak-usage frequency. The GUI additionally includes one or more other user input fields configured to receive a user input identifying a peak-usage relationship and/or KPI frequency periodicity monitoring. Process flows from operation 501 to operation 503.

In operation 503, a first monitoring profile is created. In a non-limiting example, a monitoring profile for each of the selected KPI, such as in user input fields 210, 310, domains such as in user input fields 202, 302, technology such as in user input fields 204, 304, vendor such as in user input fields 206, 306, node such as in user input fields 208, 308, and frequency such as user input fields 212, 312, is created. Process flows from operation 503 to 505.

In operation 505, the created monitoring profile is stored. For example, the monitoring profile is stored in database 103 and/or memory 605. Process flows from operation 505 to operation 507.

In operation 507, network monitoring system 100 collects target KPI data over a defined period of time. For example, network monitoring system 100 collects target KPI data of KPI data specified in user input field 210, 310 for a time period specified in user input field 212, 312. Process flows from operation 507 to 509.

In operation 509, network monitoring system 100 determined a peak usage of the selected KPI in the monitoring profile over the selected time period specified in the monitoring profile. For example, the data collected in operation 507 for the time period specified in user input field 212, 312 is filtered for the highest value providing the peak usage during the defined period. In some examples, a sliding window method is used to reduce latency. Process flows from operation 509 to 511.

In operation 511, the peak usage tracked in the monitoring profile is periodically reported. In some embodiments, the peak usage is reported at the end or the monitoring time period or frequency specified in user input fields 212, 312. In some embodiments, the user is able to specify the reporting periodicity.

FIG. 6 is a functional block diagram of a computer or processor-based system 600 upon which or by which an embodiment is implemented.

Processor-based system 600 is programmed to facilitate targeted KPI network monitoring and generating one or more targeted KPI management profiles, as described herein, and includes, for example, bus 601, processor 603, and memory 605 components.

In some embodiments, the processor-based system is implemented as a single "system on a chip." Processor-based system 600, or a portion thereof, constitutes a mechanism for performing one or more steps of facilitating targeted KPI network monitoring and generating one or more KPI management profiles.

In some embodiments, the processor-based system 600 includes a communication mechanism such as bus 601 for transferring information and/or instructions among the components of the processor-based system 600. Processor 603 is connected to the bus 601 to obtain instructions for execution and process information stored in, for example, the memory 605. In some embodiments, the processor 603 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 603. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 603 performs a set of operations on information as specified by a set of instructions stored in memory 605 related to facilitating targeted KPI network monitoring and generating one or more KPI management profiles. The execution of the instructions causes the processor to perform specified functions.

The processor 603 and accompanying components are connected to the memory 605 via the bus 601. The memory 605 includes one or more of dynamic memory (e.g., RAM, magnetic disk, writable optical disk, or the like) and static memory (e.g., ROM, CD-ROM, or the like) for storing executable instructions that when executed perform the steps described herein to facilitate targeted KPI network monitoring and generating one or more KPI management profiles. The memory 605 also stores the data associated with or generated by the execution of the steps.

In one or more embodiments, the memory 605, such as a random access memory (RAM) or any other dynamic storage device, stores information including processor instructions for facilitating dynamic temporal-based network monitoring and generating one or more KPI management profiles. Dynamic memory allows information stored therein to be changed. RAM allows a unit of information stored at a location called a memory address to be stored and retrieved independently of information at neighboring addresses. The memory 605 is also used by the processor 603 to store temporary values during execution of processor instructions. In various embodiments, the memory 605 is a read only memory (ROM) or any other static storage device coupled to the bus 601 for storing static information, including instructions, that is not capable of being changed by processor 603. Some memory is composed of volatile storage that loses the information stored thereon when power is lost. In some embodiments, the memory 605 is a non-volatile (persistent) storage device, such as a magnetic disk, optical disk or flash card, for storing information, including instructions, that persists even when the system 600 is turned off or otherwise loses power.

The term "computer-readable medium" as used herein refers to any medium that participates in providing information to processor 603, including instructions 609 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

In some embodiments, an system includes a processor and a memory having instructions stored thereon that, when executed by the processor, cause a graphical user interface (GUI) to be output by display 611. Display 611 is an output device for presentation of information in visual or tactile form (the latter used for example in tactile electronic displays for blind people). When the input information that is supplied has an electrical signal the display is called an electronic display. In some embodiments, display 611 is part of UI 607.

UI 607 allows effective operation and control of system 600 by a user. In some embodiments, user interfaces are composed of one or more layers, including a human-machine interface (HMI) that interfaces machines with physical input hardware such as keyboards, mice, or game pads, and output hardware such as computer monitors, speakers, printers and other suitable user interfaces are within the contemplated scope of the disclosure. Additional user interface layers interact with one or more human senses, including: tactile user interface (touch), visual user interface (sight), auditory user interface (sound), olfactory user interface (smell), equilibrial user interface (balance), gustatory user interface (taste) and other suitable user interface layers are within the contemplated scope of the disclosure.

In some embodiments, a system includes a processor and a memory that includes instructions stored thereon that, when executed by the processor, cause a graphical user interface (GUI) to be output by a display. In some embodiments, the GUI includes a user input field configured to receive a user input identifying a target KPI associated with a network. In some embodiments, the GUI includes a user input field configured to receive a user input identifying a KPI peak-usage frequency. In some embodiments, the GUI includes a user input field configured to receive a user input identifying a peak-usage relationship. In some embodiments, the instruction execution further includes creating a monitoring profile based on the target KPI for the KPI peak-usage frequency for the peak-usage relationship. In some embodiments, the instruction execution further includes storing the monitoring profile. In some embodiments, the instruction execution further includes monitoring the target KPI for the KPI peak-usage frequency based on the monitoring profile. In some embodiments, the instruction execution further includes collecting target KPI data over a period defined by the KPI peak-usage frequency. In some embodiments, the instruction execution further includes determining a peak-usage during the period defined by the KPI peak-usage frequency based on the collected target KPI data. In some embodiments, the instruction execution further includes periodically reporting peak-usage data based on the monitoring profile.

Implementations include one or more of the following features. The system where the GUI further includes a fourth user input field configured to receive a fourth user input identifying one or more networks in which to monitor the target KPI associated with the one or more networks. The GUI further includes a fifth user input field configured to receive a fifth user input identifying a communications technology in which to monitor the target KPI associated with the one or more networks. The GUI further includes a sixth user input field configured to receive a sixth user input identifying a vendor of the communications technology in which to monitor the target KPI associated with the one or more networks. The GUI further includes a seventh user input field configured to receive a seventh user input identifying a node included in the one or more networks in which to monitor the target KPI associated with the one or more networks. The first monitoring profile includes a first target KPI during a first KPI peak-usage frequency for a first peak-usage relationship. The instructions stored on the memory further cause the processor to create a second monitoring profile that include: a fourth user input identifying a second target KPI associated with one or more networks. A fifth user input identifying a second KPI peak-usage frequency. A sixth user input identifying a second peak-usage relationship. The instructions stored on the memory further cause the processor to, before the first monitoring profile is created, determine whether a stored monitoring profile that matches the first monitoring profile has been created previously. The instructions stored on the memory further cause the processor to responsive to the first monitoring profile being created previously, cause the GUI to further include a warning message field configured to present information to indicate the first monitoring profile has been previously created. A fourth user input field configured to receive a fourth user input selecting the stored monitoring profile that matches the first monitoring profile. The instructions stored on the memory further cause the processor to determine whether user authorization exists to allow for the stored monitoring profile to be monitored. The instructions stored on the memory further cause the processor to create a watch list that includes each user-created monitoring profile and user-selected monitoring profile. Implementations of the described techniques include hardware, a method or process, or computer software on a computer-accessible medium.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing system, cause the system to perform the actions. In some embodiments, a method causing, by a processor, a graphical user interface (GUI) to be output by a display. The GUI includes a first user input field configured to receive a first user input identifying a target key performance indicator (KPI) associated with a network. A second user input field configured to receive a second user input identifying a KPI peak-usage frequency. A third user input field configured to receive a third user input identifying a peak-usage relationship. The method further includes creating a first monitoring profile based on the target KPI for the KPI peak-usage frequency for the peak-usage relationship. Storing the first monitoring profile. Monitoring the target KPI for the KPI peak-usage frequency based on the first monitoring profile. Collecting target KPI data over a period defined by the KPI peak-usage frequency. Determining a peak-usage during the period defined by the KPI peak-usage frequency based on the collected target KPI data. Periodically reporting peak-usage data based on the first monitoring profile. Other embodiments of this aspect include corresponding computer systems, system, and computer programs recorded on one or more computer storage devices, each configured to perform the actions of the methods.

Implementations include one or more of the following features. The method where the first monitoring profile includes a first target KPI during a first KPI peak-usage frequency for a first peak-usage relationship. The method includes creating a second monitoring profile that includes a fourth user input identifying a second target KPI associated with one or more networks. A fifth user input identifying a second KPI peak-usage frequency. A sixth user input identifying a second peak-usage relationship. The method includes before the first monitoring profile is created, determining whether a stored monitoring profile that matches the first monitoring profile has been created previously. The method includes responsive to the first monitoring profile being created previously, causing the GUI to be output by the display. The GUI includes a warning message field configured to present information to indicate the first monitoring profile has been previously created. A fourth user input field configured to receive a fourth user input selecting the stored monitoring profile that matches the first monitoring profile. The method includes responsive to the stored monitoring profile being selected, determining whether user authorization exists to allow for the stored monitoring profile to be monitored. The method includes creating a watch list that includes each user-created monitoring profile and user-selected monitoring profile. Implementations of the described techniques include hardware, a method or process, or computer software on a computer-accessible medium.

In some embodiments, includes a non-transitory computer readable medium having instructions stored thereon that cause a GUI to be output by a display. The GUI includes a first user input field configured to receive a first user input identifying a target key performance indicator (KPI) associated with a network. A second user input field configured to receive a second user input identifying a KPI peak-usage frequency. A third user input field configured to receive a third user input identifying a peak-usage relationship. The instructions further include creating a first monitoring profile based on the target KPI for the KPI peak-usage frequency for the peak-usage relationship. Store the first monitoring profile. Monitor the target KPI for the KPI peak-usage frequency based on the first monitoring profile. Collect target KPI data over a period defined by the KPI peak-usage frequency. Determine a peak-usage during the period defined by the KPI peak-usage frequency based on the collected target KPI data. Periodically report peak-usage data based on the first monitoring profile. Other embodiments of this aspect include corresponding computer systems, system, and computer programs recorded on one or more computer storage devices, each configured to perform the actions of the methods.

Implementations include one or more of the following features. The non-transitory computer readable medium where the GUI further includes a fourth user input field configured to receive a fourth user input identifying one or more networks in which to monitor the target KPI associated with the one or more networks. The GUI further includes a fifth user input field configured to receive a fifth user input identifying a communications technology in which to monitor the target KPI associated with the one or more networks. The GUI further includes a sixth user input field configured to receive a sixth user input identifying a vendor of the communications technology in which to monitor the target KPI associated with the one or more networks. Implementations of the described techniques include hardware, a method or process, or computer software on a computer-accessible medium.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:
1. An system, comprising:
a processor; and
a memory having instructions stored thereon that, when executed by the processor, cause the system to:
cause a graphical user interface (GUI) to be output by a display, the GUI comprising:

a first user input field configured to receive a first user input identifying a target key performance indicator (KPI) associated with a network;

a second user input field configured to receive a second user input identifying a KPI peak-usage frequency; and a third user input field configured to receive a third user input identifying a peak-usage relationship;

create a first monitoring profile based on the target KPI for the KPI peak-usage frequency for the peak-usage relationship;

store the first monitoring profile;

monitor the target KPI for the KPI peak-usage frequency based on the first monitoring profile;

collect target KPI data over a period defined by the KPI peak-usage frequency;

determine a peak-usage during the period defined by the KPI peak-usage frequency based on the collected target KPI data; and periodically report peak-usage data based on the first monitoring profile.

2. The system of claim 1, wherein the GUI further comprises:

a fourth user input field configured to receive a fourth user input identifying one or more networks in which to monitor the target KPI associated with the one or more networks.

3. The system of claim 2, wherein the GUI further comprises:

a fifth user input field configured to receive a fifth user input identifying a communications technology in which to monitor the target KPI associated with the one or more networks.

4. The system of claim 3, wherein the GUI further comprises:

a sixth user input field configured to receive a sixth user input identifying a vendor of the communications technology in which to monitor the target KPI associated with the one or more networks.

5. The system of claim 4, wherein the GUI further comprises:

a seventh user input field configured to receive a seventh user input identifying a node included in the one or more networks in which to monitor the target KPI associated with the one or more networks.

6. The system of claim 1, wherein the first monitoring profile includes a first target KPI during a first KPI peak-usage frequency for a first peak-usage relationship;

wherein the instructions stored on the memory further cause the system to:

create a second monitoring profile that includes:
a fourth user input identifying a second target KPI associated with one or more networks;
a fifth user input identifying a second KPI peak-usage frequency; and
a sixth user input identifying a second peak-usage relationship.

7. The system of claim 1, wherein the instructions stored on the memory further cause the system to:

before the first monitoring profile is created, determine whether a stored monitoring profile that matches the first monitoring profile has been created previously.

8. The system of claim 7, wherein the instructions stored on the memory further cause the system to:

responsive to the first monitoring profile being created previously, cause the GUI to further comprise:

a warning message field configured to present information to indicate the first monitoring profile has been previously created; and a fourth user input field configured to receive a fourth user input selecting the stored monitoring profile that matches the first monitoring profile.

9. The system of claim 8, wherein the instructions stored on the memory further cause the system to:

determine whether user authorization exists to allow for the stored monitoring profile to be monitored.

10. The system of claim 9, wherein the instructions stored on the memory further cause the system to:

create a watch list that includes each user-created monitoring profile and user-selected monitoring profile.

11. A method, comprising:

causing, by a processor, a graphical user interface (GUI) to be output by a display, the GUI comprising:

a first user input field configured to receive a first user input identifying a target key performance indicator (KPI) associated with a network;

a second user input field configured to receive a second user input identifying a KPI peak-usage frequency; and a third user input field configured to receive a third user input identifying a peak-usage relationship;

creating a first monitoring profile based on the target KPI for the KPI peak-usage frequency for the peak-usage relationship;

storing the first monitoring profile;

monitoring the target KPI for the KPI peak-usage frequency based on the first monitoring profile;

collecting target KPI data over a period defined by the KPI peak-usage frequency;

determining a peak-usage during the period defined by the KPI peak-usage frequency based on the collected target KPI data; and periodically reporting peak-usage data based on the first monitoring profile.

12. The method of claim 11, wherein the first monitoring profile includes a first target KPI during a first KPI peak-usage frequency for a first peak-usage relationship;

the method further comprising:

creating a second monitoring profile that includes:
a fourth user input identifying a second target KPI associated with one or more networks;
a fifth user input identifying a second KPI peak-usage frequency; and
a sixth user input identifying a second peak-usage relationship.

13. The method of claim 11, further comprising:

before the first monitoring profile is created, determining whether a stored monitoring profile that matches the first monitoring profile has been created previously.

14. The method of claim 13, further comprising:

responsive to the first monitoring profile being created previously, causing the GUI to be output by the display, the GUI comprising:

a warning message field configured to present information to indicate the first monitoring profile has been previously created; and a fourth user input field configured to receive a fourth user input selecting the stored monitoring profile that matches the first monitoring profile.

15. The method of claim 14, further comprising:

responsive to the stored monitoring profile being selected, determining whether user authorization exists to allow for the stored monitoring profile to be monitored.

16. The method of claim 15, further comprising:
creating a watch list that includes each user-created monitoring profile and user-selected monitoring profile.

17. A non-transitory computer readable medium having instructions stored thereon that, when executed by a processor, cause an system to:
   cause a graphical user interface (GUI) to be output by a display, the GUI comprising:
      a first user input field configured to receive a first user input identifying a target key performance indicator (KPI) associated with a network;
      a second user input field configured to receive a second user input identifying a KPI peak-usage frequency; and
      a third user input field configured to receive a third user input identifying a peak-usage relationship;
   create a first monitoring profile based on the target KPI for the KPI peak-usage frequency for the peak-usage relationship;
   store the first monitoring profile;
   monitor the target KPI for the KPI peak-usage frequency based on the first monitoring profile;
   collect target KPI data over a period defined by the KPI peak-usage frequency;
   determine a peak-usage during the period defined by the KPI peak-usage frequency based on the collected target KPI data; and
   periodically report peak-usage data based on the first monitoring profile.

18. The non-transitory computer readable medium of claim 17, wherein the GUI further comprises:
   a fourth user input field configured to receive a fourth user input identifying one or more networks in which to monitor the target KPI associated with the one or more networks.

19. The non-transitory computer readable medium of claim 18, wherein the GUI further comprises:
a fifth user input field configured to receive a fifth user input identifying a communications technology in which to monitor the target KPI associated with the one or more networks.

20. The non-transitory computer readable medium of claim 19, wherein the GUI further comprises:
   a sixth user input field configured to receive a sixth user input identifying a vendor of the communications technology in which to monitor the target KPI associated with the one or more networks.

* * * * *